United States Patent [19]

Bilodeau et al.

[11] Patent Number: 4,955,462
[45] Date of Patent: Sep. 11, 1990

[54] POLYMER CONCRETE CONVEYOR ROLLER

[75] Inventors: Marcel J. Bilodeau, St. Etienne; André Dube, Beauport; André-Paul Quesnel, St. Jean Chrysostome, all of Canada

[73] Assignee: Produits Carmine Inc., Quebec, Canada

[21] Appl. No.: 403,116

[22] Filed: Sep. 5, 1989

[51] Int. Cl.$^5$ ............................................. B65G 13/00
[52] U.S. Cl. ...................................... 193/37; 384/480; 277/57
[58] Field of Search ................... 198/780, 843; 193/37; 384/480, 488, 489; 277/57

[56] References Cited

U.S. PATENT DOCUMENTS

| | | |
|---|---|---|
| 1,888,475 | 11/1932 | Schmitz . |
| 1,958,412 | 5/1984 | Andrada et al. ............... 384/480 |
| 1,991,077 | 2/1935 | Brittain, Jr. . |
| 2,473,513 | 6/1949 | Dewey . |
| 2,949,333 | 8/1960 | Lesinski . |
| 3,070,410 | 12/1962 | Derks . |
| 3,259,442 | 7/1966 | Boghosian . |
| 3,406,438 | 10/1968 | Reilly . |
| 3,610,387 | 10/1971 | Vom Stein ........................ 193/37 |
| 3,711,912 | 1/1973 | Teske et al. . |
| 3,755,870 | 9/1973 | Young et al. . |
| 3,770,993 | 11/1973 | Schultenkamper . |
| 3,772,751 | 11/1973 | Lovett . |
| 3,776,559 | 12/1973 | Cawthorn . |
| 3,841,721 | 10/1974 | Coutant et al. ................ 193/37 X |
| 3,847,260 | 11/1974 | Fowler . |
| 3,888,131 | 6/1975 | Reid . |
| 3,944,055 | 3/1976 | Stumpf ........................ 198/780 X |
| 3,984,160 | 10/1976 | Sheldon et al. ................ 384/484 |
| 3,994,380 | 11/1976 | Hope et al. . |
| 4,022,479 | 5/1977 | Orlowski . |
| 4,029,200 | 6/1977 | Dillon . |
| 4,093,324 | 6/1978 | Carrigan ........................ 304/480 |
| 4,097,095 | 6/1978 | Zimmer ........................ 193/37 X |
| 4,101,180 | 7/1978 | Anderson et al. . |
| 4,114,902 | 9/1978 | Orlowski . |
| 4,139,203 | 2/1979 | Garrison ........................ 384/480 X |
| 4,175,752 | 11/1979 | Orlowski . |
| 4,199,154 | 4/1980 | Mueller . |
| 4,203,509 | 5/1980 | Thompson et al. . |
| 4,277,114 | 7/1981 | Lindegger ..................... 384/480 X |
| 4,312,444 | 1/1982 | Mushovic ........................ 198/780 |
| 4,344,218 | 8/1982 | Hooper et al. ................ 193/37 X |
| 4,440,295 | 4/1984 | Blackwood-Murray et al. . |
| 4,451,046 | 5/1984 | Bliven . |
| 4,452,497 | 6/1984 | Zillhardt . |
| 4,505,381 | 3/1985 | Major . |
| 4,557,490 | 12/1985 | Tauares ........................ 384/480 X |
| 4,576,383 | 3/1986 | Ballard . |
| 4,577,747 | 3/1986 | Martin . |
| 4,645,071 | 2/1987 | Faulkner et al. . |

FOREIGN PATENT DOCUMENTS

| | | | |
|---|---|---|---|
| 1187030 | 5/1985 | Canada ........................ 193/37 |
| 2723808 | 11/1978 | Fed. Rep. of Germany ........ 193/37 |
| 3027157 | 2/1982 | Fed. Rep. of Germany ........ 193/37 |
| 0257045 | 6/1988 | Fed. Rep. of Germany ........ 193/37 |
| 1208000 | 2/1960 | France ........................ 193/37 |
| 83543 | 7/1964 | France ........................ 193/37 |
| 0275833 | 10/1970 | U.S.S.R. ..................... 198/780 |
| 1147911 | 4/1969 | United Kingdom ............ 198/780 |
| 1591194 | 6/1981 | United Kingdom ............ 193/37 |
| 2165920 | 4/1986 | United Kingdom ............ 193/37 |

Primary Examiner—Joseph E. Valenza
Assistant Examiner—D. Glenn Dayoan
Attorney, Agent, or Firm—Darby & Darby

[57] ABSTRACT

Disclosed is a conveyor roller comprising a shaft, a plurality of bearings provided on the shaft, and a roller body having a cylindrical side surface and two exterior end walls, the body being fixed to the bearings, and being rotatable on the shaft, wherein the roller body is made with a moldable polymer concrete material, and contains an encapsulated labyrinth seal connected to the shaft, the seal being provided inside each end of the roller body at a position on the shaft separated from the bearings and each exterior end wall of the roller body, such that the seal isolates the bearings from exterior contaminants. The roller according to the invention is more resistant to contamination, and therefore is more durable.

19 Claims, 3 Drawing Sheets

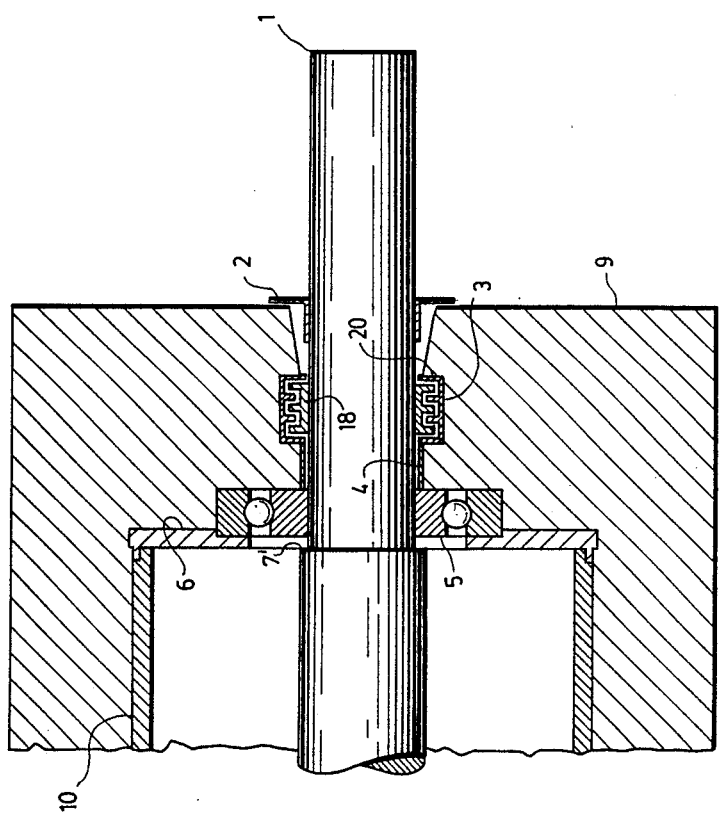

POLYMER CONCRETE CONVEYOR ROLLER

BACKGROUND OF THE INVENTION

The present invention relates to a conveyor roller whose cylindrical body is made from a moldable polymer concrete material. The invention further relates to a conveyor roller provided with at least one encapsulated labyrinth seal mounted on a shaft of the roller inside each end of the roller body such that the seal is contained within the roller body between a bearing of the roller and an exterior side of the roller body.

Conveyor rollers are conventionally made of steel, that is the conventional roller comprises a cylindrical steel tube which rotates on a shaft by means of bearings. The present invention relates to a conveyor roller made of a moldable polymer concrete or resin concrete material which has many advantages over steel or metal constructions. A roller constructed of a polymer concrete material can be more shock resistant, more resistant to acids and caustic substances from low pH to high pH, and easier to manufacture than a roller constructed of steel or other metal materials.

A problem arising with conventional conveyor rollers, however, is that the bearings of the roller become contaminated with foreign matter (such as dust particles) originating from the environment in which the roller operates. Contamination of the roller bearings is the primary reason for roller breakdown. Contamination will damage a bearing due to mechanical wear on the bearing caused by the interaction of the foreign particulate matter and the bearing movements, and due to chemical wear, such as rusting. A damaged bearing can decrease operating efficiency, require replacement, or lock up causing possible damage to a conveyor belt. It is known to the inventors to make a conveyor roller using a polymer concrete, however, the known roller has no labyrinth seal provided inside the roller body to protect the bearings against contamination.

SUMMARY OF THE INVENTION

It is therefore an object of the present invention to provide a moldable polymer concrete conveyor roller which is provided with encapsulated labyrinth seals provided inside the roller body to protect the bearings against contamination.

The object of the invention is achieved by a conveyor roller comprising a shaft, a plurality of bearings provided on the shaft, and a roller body having a cylindrical side surface and two exterior ends walls, the body being fixed to the bearings, and being rotatable on the shaft, wherein the roller body is made with a moldable polymer concrete material, and contains encapsulated labyrinth seal means which are connected to the shaft and are provided inside each end of the roller body between the bearings and each exterior and wall of the roller body.

Preferably the encapsulated labyrinth seal is packaged with a high viscosity heat resistant lubricant. It is also preferable to separate each labrinth seal from each associated bearing by means of a spacer ring having a diameter smaller than both the bearing housing and the labyrinth seal housing, so that the roller body material can define a wall between the bearing and seal. The spacer ring may have an inner diameter which is only slightly greater than the diameter of the shaft, so that the path through which contaminants must travel to reach the bearings is further restricted.

The conveyor roller according to the invention is further improved by providing the roller with a hollow core through which heat, generated by the bearings and transferred to the shaft, can be transferred from the shaft through the hollow core to the roller body at a position in the roller body proximal to the exterior side surface thereof. This hollow core is advantageously filled with air.

The polymer concrete may comprise as binding agent one or more products selected from the group consisting of polyesters, polyamines, polyethers, raw glass and polycarbonates. Advantagenously, polymer concrete comprises a resin mix that generates heat during curing, so that no heat needs to be added during curing.

Advantageously, the polymer concrete used to form the roller body according to the invention, may be obtained by mixing one or more resins, such as unsaturated polyester resins (especially a flexible, low reactivity, intermediate viscosity, isophthalic acid based, unsaturated polyester resin, such as Reichhold 31-830 TM or Kopper 1201-5 TM) in the presence of an approxiate catalyst (especially Cobalt/Methyl Ethyl Ketone Benzoyl Peroxide systems or Benzoyl Peroxide, such as Superox 46-706 TM) with a filter especially in powder form.

Alternatively, the aforesaid resins may be one or more polyester resins, such as Polylite TM polyester resin (Reichhold's 33-402) which is a rigid, medium reactivity, premium chemical resistant, isophthalic based polyester. This resin is low viscosity, thixotropic and pre-promoted for room temperature cure with the addition of Methyl Ethyl Ketone Peroxide or Benzoyl Peroxide.

One skilled in the art can determine easily the particle size of the powder defining the filler. This particulate size may vary within a range so far as it can be homogeneously mixed with the resin. Preferably an equal mixture of 60,36 and 16 grit.

The preferred filter may be selected amongst three different fillers to strengthen the body and also increase the abrasion resistance:

1—a mixture of silica sands and iron dust which gives an abrasion of 11 mg on the A.S.T.M. taber test C.S. 17;
2—a mixture of silicon carbide and iron dust to achieve a taber of 7 mg;
3—pure silicon carbide which gives a taber of 3 mg.

In comparison, a steel plate of 40,000 psi will lose 238 mg in the same test.

The polymer concrete described may also have great compression resistance. Depending on the mixture used, one can obtain a compression resistance between 19,000 psi to 74,000 psi.

Preferably, in order to obtain a polymer concrete which is particularly able to resist impacts due to material flex, the resin, Reichhold's 31-830 TM or Kopper's 1201-5 TM, is selected and the filler is chosen to be silicon carbide. The ratio by volume of silicon carbide powder (filler) to resin is 3:1.

Preferably, in order to obtain a polymer concrete which is for standard conventional uses, the selected resin consists of Reichhold's 31-830 polyester or Kopper's 1201-5 equally mixed with Reichhold's 33-402, the resulting resin is then mixed with silicon carbide powder at the above mentioned ratio.

BRIEF DESCRIPTION OF THE DRAWINGS

Other objects and advantages of the invention will become clear by the following description of a preferred embodiment with reference to the appended drawings in which:

FIG. 3 is an enlarged cross-sectional view of another preferred embodiment showing in detail another encapsulated labyrinth seal.

DETAILED DESCRIPTION OF THE PREFERRED EMBODIMENTS

Figure 1:
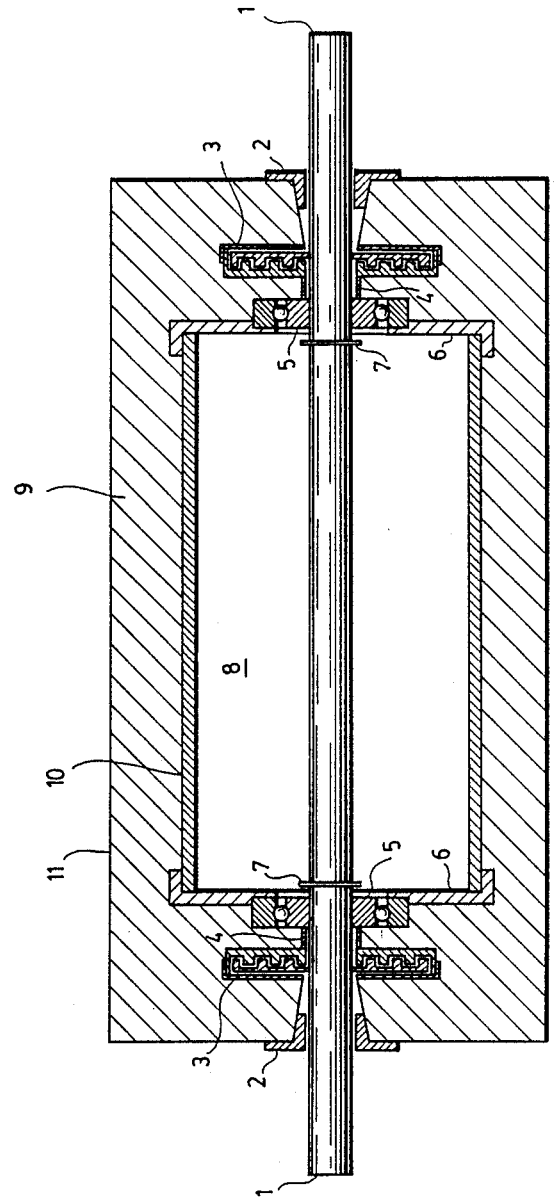
FIG. 1 is a cross-section through the center of the shaft of the conveyor roller according to the preferred embodiment.

In the preferred embodiment, the conveyor roller has a body 9, a shaft 1, and bearings 5. The body 9 rotates about the shaft 1 by means of the bearings 5. Cap 2 and labyrinth seal 3 prevent dust, moisture and/or other foreign matter from contaminating the bearings 5, in order to prolong the life of the bearings 5. End plates 6 hold jacket 10 which forms a hollow core 8. Spacer ring 4 separates the tongue and groove arrangement 3 from the bearings 5 so that the material of the body 9 may support the bearings 5. Retainers 7 are secured to the shaft 1 so that the body 9 may not move in the direction of the axis of the shaft 1.

The body 9 is formed by molding a polymer concrete material in a mold containing the components attached to the shaft 1. In the preferred embodiment, the polymer concrete is obtained by mixing three parts by volume of silicon carbide with one part polymer resin or polymer resin mix, and effective amounts of a catalyst. The polymer resin is preferably a flexible, low reactivity, intermediate viscosity, isophthalic acid based, unsaturated polyester resin, such as the commercial products; Reichhold TM no. 31-830 and Kopper TM no. 1201-5. The resin may also consist of a mixture of at least one resin with the above mentioned characteristics and a rigid, medium respectively, premium chemical resistant, isophthalic based, low viscosity, thixotropic resin, such as the commercial product; Reichhold TM no. 33-402. The catalyst may be selected amongst cobalt/methyl ethyl ketone benzoyl peroxide systems, methyl ethyl ketone benzoyl peroxide and benzoyl peroxide.

Figure 2:
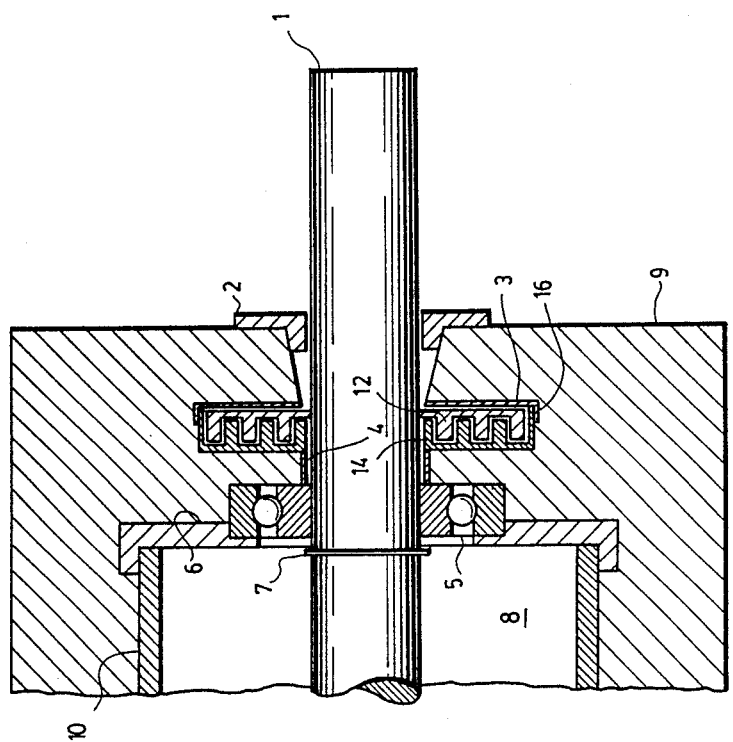
FIG. 2 is an enlarged cross-sectional view of the preferred embodiment showing in detail an encapsulated labyrinth seal.

The primary reason for bearing breakdown in a conveyor roller is contamination due to dust or moisture. FIG. 2 shows an encapsulated labyrinth seal 3 used to prevent foreign matter such as dust or other particulate matter from contaminating the roller bearings 5. The seal 3 is packed with grease, or any suitable high viscosity heat resistant lubricant, to provide a barrier to the migration of dust particles. Cap 2 is shown in FIG. 2 connected to the roller body 9, and provides a coarse barrier to larger dust particles. The space between the cap 2 and the seal 3 can also be packed with grease. The seal 3 shown in FIG. 2 has concentric non-contacting tongues and grooves projecting in the direction of the shaft 1. The labyrinth seal comprises a shaft mounted piece 12 and a roller body mounted piece 14 each having concentric tongues and grooves to form a non-contacting tongue and groove arrangement. The seal 3 is encapsulated by a cap 16, which increases the labyrinth path and contains the seal 3 during molding. The purpose of the seal 3 is to pose a long and tortuous path through which any dust or foreign matter would need to travel to reach the bearings 5. The seal 3 can act as a trap for dust or other foreign matter because of the path through which foreign matter must travel as well as the centrifugal force exerted by the seal on any matter in the seal, which prevents any matter serving the seal 3 from returning to the shaft 1.

FIG. 3 shows a labyrinth seal 3 according to another preferred embodiment. Tongues and grooves are arranged in the radial direction of the shaft 1. A shaft mounted piece 18 having three radial discs, and a roller body mounted piece receiving the three discs form the seal 3. The seal 3 shown in FIG. 3 has a smaller diameter, making it more useful for smaller diameter rollers. The principle of operation of the seal 3 shown in FIG. 3 is similar to that of the seal shown in FIG. 2. The cap 2 is shown mounted on the shaft 1 instead of the roller body 9 as in FIG. 2. The shaft 1 is shown to have a ridge retainer 7' instead of a ring retainer 7 as shown in FIG. 2.

The labyrinth seal 3 placed inside the roller body 9 as shown in the Figures offers several advantages. Among these advantages, there is the placement of the seal 3 between the end of the roller body 9 and the bearing 5 with ample space to allow the body 9 to support a housing of the seal 3 made of piece 20 or cap 16 and piece 14, allows a construction to be made wherein the seal 3 and the bearing 5 are sufficiently secured by the body 9. Also, there is a composite sealing which is preferably achieved by the end cap 2, the space between the end cap 2 and the labyrinth seal 3, the space being advantageously filled with grease, the labyrinth seal 3 itself, and the separation between the seal 3 and the bearing 5 provided by the spacer ring 4. The spacer ring has an inner diameter only slightly larger than the diameter of the shaft. The combination of such impediments provides a particularly preferred improved seal against contamination by foreign matter.

In operation, the bearings 5 generate heat as a result of friction. The heat is essentially transferred from the bearings 5 to the shaft 1 to which the bearings 5 are mounted. The heat is conducted by the shaft 1 to the ends of the shaft 1 where the heat is dissipated to the outside of the roller. The heat is also conducted by the shaft 1 to the hollow core 8 where the heat is transferred to a jacket 10 of the core 8. From the jacket 10 to surface 11 of the roller, the heat is transferred relatively efficiently due to the large transfer area, and from the surface 11 the heat is dissipated to the outside of the roller. In the preferred embodiment, the end plates 6 are made of a good thermal conductor, so that the heat generated by the bearings 5 at the radial outer surface of the bearings 5 is efficiently conducted toward the surface 11 for dissipation of the outside. While the jacket 10 can be made of plastic or cardboard, it can also be made of a good thermal conductor such as metal, so that the heat conducted by the end plates 6 is transferred over the whole surface of the jacket 10 for a more efficient transfer to the surface 11 of the roller. Advantageously, there is at least 2.5 cm of resin concrete between the jacket 10 and the surface 11.

As can be understood from the above description, the invention provides a conveyor roller which offers the following advantages; it is resistant to dust contamination due to the cap 2 and the encapsulated labyrinth seal 3 contained within the roller body 9 to improve the isolation of contaminants from the bearings 5, it is resistant to shocks due to the use of a shock resistant polymer concrete, it requires no lubricant maintenance for the life of the roller, it is less likely to lock up or break which can cause damage to a conveyor belt, the polymer concrete can be made to be resistant to caustic substances such as cleaning solutions, and it is easy to manufacture in any size or shape due to the moldable construction of the roller body 9. Of course, the molding of the conveyor roller is carried out in accordance with molding techniques well known in the art.

It is to be understood that the above description of the invention is not intended to limit the scope of the present invention as defined in the appended claims.

We claim:

1. In a conveyor roller comprising a shaft, a plurality of bearings provided on said shaft, and a roller body having an exterior cylindrical wall and two exterior end walls, said body being fixed to said bearings, and being rotatable on said shaft;

the improvements wherein;

said roller body is made with a moldable polymer concrete material, and contains encapsulated labyrinth seal means which are connected to said shaft and are provided inside each end of said roller body between said bearings and each said exterior end wall; and a spacer ring at each end of said roller body connects a housing of said labyrinth seal means to a housing of said bearings, said ring having a diameter which is smaller than both a diameter of the housing of said bearings and a diameter of the housing of said labyrinth seal means, so that said material of said body defines at each end of said roller body a wall between said bearings and said labyrinth seal means.

2. A conveyor roller according to claim 1, wherein said labyrinth seal means is packed with a high viscosity heat resistant lubricant.

3. A conveyor roller according to claim 1, wherein said spacer ring has an inner diameter which is slightly greater than a diameter of said shaft.

4. A conveyor roller according to claim 1, wherein an end cap is provided at one of said exterior end walls of said roller body, said end cap fitting over said shaft, such that said end cap act as a coarse seal.

5. A conveyor roller according to claim 1, wherein said material is formed by a mixture of three parts silicon carbide and one part polyester resin.

6. A conveyor roller according to claim 1, wherein said roller body comprises a hollow core through which heat is transferred from said shaft to an outer surface of said core in operation, said heat being generated in operation by said at least one of said bearings and transferred to said shaft, so that said heat generated is transferred efficiently to said cylindrical wall.

7. A conveyor roller according to claim 1, wherein said labyrinth seal means comprises a concentric annular non-contacting tongue and groove arrangement, said tongues and grooves projecting in a direction parallel to said shaft.

8. A conveyor roller according to claim 1, wherein said labyrinth seal means comprises a plurality of adjacently disposed non-contacting tongue and groove arrangement, said arrangement having disc-like tongues fixed to said shaft, such that said tongues and grooves project in a direction perpendicular to said shaft.

9. A conveyor roller comprising a shaft, a plurality of bearings provided on said shaft, and a roller body having an exterior cylindrical wall and two exterior end walls, said body being fixed to said bearings, and being rotatable on said shaft, wherein;

said roller body is made with a moldable polymer concrete material, and at each end of said roller body, encapsulated labyrinth seal means are positioned inside and roller body and rotatably connect said body to said shaft, said labyrinth seal means being provided inside said roller body at a position on said shaft between said bearings and said exterior end wall, said position being substantially spaced from said bearings and said exterior end wall, a spacer ring having a diameter only slightly greater than a diameter of said shaft being provided between said bearings and said labyrinth seal means, so that said material of said body defines, at each end of said roller body, a wall between said bearings and said labyrinth seal means, and a wall between said end walls and said labyrinth seal means, providing a combined isolation of said bearings from exterior contaminants.

10. In a conveyor roller comprising a shaft, a plurality of bearings provided on said shaft, and a roller body having an exterior cylindrical wall and two exterior end walls, said body being fixed to said bearings, and being rotatable on said shaft;

the improvements wherein:

said roller body is made with a moldable polymer concrete material, and contains encapsulated labyrinth seal means which are connected to said shaft and are provided inside each end of said roller body between said bearings and each said exterior end wall;

said material defining at each end of said roller body a wall between said end wall and a housing of said labyrinth seal means.

11. A conveyor roller according to claim 10, wherein said labyrinth seal means is packed with a high viscosity heat resistant lubricant.

12. A conveyor roller according to claim 10, wherein an end cap is provided at one of said exterior end walls of said roller body, said end cap fitting over said shaft, such that said end cap acts as a course seal.

13. A conveyor roller according to claim 12, wherein said end cap is fixed to said shaft and makes friction contact with one of said exterior end walls.

14. A conveyor roller according to claim 12, wherein said end cap is fixed to one of said exterior end walls and makes friction contact with said shaft.

15. A conveyor roller according to claim 12, wherein a space around said shaft between said end cap and said labyrinth seal means is packed with a high viscosity heat resistant lubricant.

16. A conveyor roller according to claim 10, wherein said material is formed by a mixture of three parts silicon carbide and one part polyester resin.

17. A conveyor roller according to claim 10, wherein said roller body comprises a hollow core through which heat is transferred from said shaft to an outer surface of said core in operation, said heat being generated in operation by said at least one of said bearings and transferred to said shaft, so that said heat generated is transferred efficiently to said cylindrical wall.

18. A conveyor roller according to claim 10, wherein said labyrinth seal means comprises a concentric annular non-contacting tongue and groove arrangement, said tongues and grooves projecting in a direction parallel to said shaft.

19. A conveyor roller according to claim 10, wherein said labyrinth seal means comprises a plurality of adjacently disposed non-contacting tongue and grooves, said tongues being disc-like and fixed to said shaft, such that said tongues and grooves project in a direction perpendicular to said shaft.

* * * * *